United States Patent
Park et al.

(10) Patent No.: US 11,626,096 B2
(45) Date of Patent: Apr. 11, 2023

(54) VEHICLE AND CONTROL METHOD THEREOF

(71) Applicants: HYUNDAI MOTOR COMPANY, Seoul (KR); KIA CORPORATION, Seoul (KR)

(72) Inventors: Chongbae Park, Suwon-si (KR); Youngbeom Kim, Bucheon-si (KR)

(73) Assignees: Hyundai Motor Company, Seoul (KR); Kia Cornoration, Seoul (KR)

( * ) Notice: Subject to any disclaimer, the term of this patent is extended or adjusted under 35 U.S.C. 154(b) by 0 days.

(21) Appl. No.: 17/459,744

(22) Filed: Aug. 27, 2021

(65) Prior Publication Data

US 2022/0130365 A1 Apr. 28, 2022

(30) Foreign Application Priority Data

Oct. 23, 2020 (KR) .......................... 10-2020-0138601

(51) Int. Cl.
*G10K 11/178* (2006.01)
*H04R 1/02* (2006.01)
(Continued)

(52) U.S. Cl.
CPC .......... *G10K 11/17823* (2018.01); *G08B 3/10* (2013.01); *G08B 21/182* (2013.01); *G10K 11/17827* (2018.01); *G10K 11/17873* (2018.01); *G10K 11/17885* (2018.01); *H04R 1/025* (2013.01); *H04R 3/00* (2013.01); *B60K 2370/157* (2019.05); *B60K 2370/178* (2019.05); *G10K 2210/1282* (2013.01); *G10K 2210/3011* (2013.01); *G10K 2210/3027* (2013.01); *G10K 2210/3044* (2013.01); *G10K 2210/3056* (2013.01); *H04R 2430/01* (2013.01); *H04R 2499/13* (2013.01)

(58) Field of Classification Search
CPC ................... B60K 2370/157; B60K 2370/178
See application file for complete search history.

(56) References Cited

U.S. PATENT DOCUMENTS

2018/0240453 A1* 8/2018 Shibuya ........... G10K 11/17837
2020/0198652 A1* 6/2020 Deshpande ............ B60K 35/00
(Continued)

FOREIGN PATENT DOCUMENTS

WO WO-2007007916 A1 * 1/2007 ............... G08B 1/08

*Primary Examiner* — Ping Lee
(74) *Attorney, Agent, or Firm* — Slater Matsil, LLP

(57) ABSTRACT

A vehicle that selectively provides important sound to an occupant includes: a microphone configured to receive a noise sound; a speaker; a storage configured to store a plurality of sound waveforms and a warning sound source corresponding to each sound waveform of the plurality of sound waveforms; and a controller configured to generate a noise canceling signal based on the noise sound, control the speaker to output a noise canceling sound corresponding to the noise canceling signal, compare a waveform of the noise sound with the plurality of sound waveforms when a sound pressure level of the noise sound is greater than a threshold value, and when the waveform of the noise sound matches any sound waveform of the plurality of sound waveforms, and control the speaker to play a warning sound source corresponding to the sound waveform matching the noise sound.

20 Claims, 6 Drawing Sheets

(51) Int. Cl.
    *H04R 3/00*     (2006.01)
    *G08B 3/10*     (2006.01)
    *G08B 21/18*     (2006.01)

(56)           References Cited

U.S. PATENT DOCUMENTS

2020/0337510 A1*  10/2020  Lee ..................... A47L 9/0081
2022/0091674 A1*   3/2022  Kemmerer ............. H04W 4/80

* cited by examiner

VEHICLE AND CONTROL METHOD THEREOF

CROSS-REFERENCE TO RELATED APPLICATION

This application claims priority to and the benefit of Korean Patent Application No 10-2020-0138601, filed on Oct. 23, 2020, the entire contents of which are incorporated herein by reference.

TECHNICAL FIELD

The present disclosure relates to a vehicle equipped with a noise canceling function and a control method thereof, and more particularly, to a vehicle for selectively providing an important sound to an occupant and a control method thereof.

BACKGROUND

The statements in this section merely provide background information related to the present disclosure and may not constitute prior art.

Noise canceling is a technology that blocks noise sound by generating destructive interference that cancels noise sound after receiving ambient noise sound through a microphone. It is a kind of Active Noise Control (ANC).

Recently, a noise canceling function is installed in a vehicle to block external and internal noise transmitted to the occupant, thereby providing a more comfortable environment to the occupant.

However, the occupant in the vehicle must be able to hear important sounds such as the horn of another vehicle and the siren of an emergency vehicle.

SUMMARY

Therefore, the present disclosure provides a vehicle capable of outputting a corresponding warning sound source by selecting a sound that the occupant must recognize while the noise canceling function is operating, and a control method thereof.

In accordance with one aspect of the disclosure, a vehicle includes: a microphone configured to receive a noise sound; a speaker; a storage configured to store a plurality of sound waveforms and a warning sound source corresponding to each of the plurality of sound waveforms; and a controller configured to generate a noise canceling signal based on the noise sound and control the speaker to output a noise canceling sound corresponding to the noise canceling signal, and the controller is configured to compare a waveform of the noise sound with the plurality of sound waveforms when a sound pressure level of the noise sound is greater than a threshold value, and when the waveform of the noise sound matches any one of the plurality of sound waveforms, control the speaker to play a warning sound source corresponding to the sound waveform matching the noise sound.

The controller may be configured to control the speaker to stop an output of the noise canceling sound while comparing the waveform of the noise sound with the plurality of sound waveforms.

The controller may be configured to, when the sound pressure level of the noise sound is greater than the threshold value and the waveform of the noise sound does not match all of the plurality of sound waveforms, control the speaker to stop the output of the noise canceling sound until the sound pressure level of the noise sound is the threshold value or less.

The controller may be configured to set the threshold value based on at least one of an average sound pressure level of the noise sound received through the microphone during a preset period and a vehicle speed.

The controller may be configured to classify the noise sound as a one-off noise sound or a continuous noise sound based on a period in which the sound pressure level of the noise sound is greater than the threshold value, and determine a distance between a source of the noise sound and the vehicle based on a frequency of the noise sound when the noise sound is classified as the continuous noise sound.

The controller may be configured to adjust a volume of the warning sound source in proportion to a frequency of the noise sound when a period in which the sound pressure level of the noise sound is greater than the threshold value is greater than or equal to a preset period.

The controller may be configured to adjust an output intensity of the noise canceling sound in inverse proportion to the frequency of the noise sound.

The controller may be configured to control the speaker to reduce an output intensity of the noise canceling sound while the warning sound source is being played through the speaker.

The controller may be configured to determine a volume of the warning sound source based on the sound pressure level of the noise sound.

The vehicle may further include: a display, and the storage may be configured to store a warning message corresponding to each of the plurality of sound waveforms, and the controller may be configured to control the display to output a warning message corresponding to a sound waveform matching the noise sound.

The controller may be configured to determine a sound waveform having a similarity with the waveform of the noise sound equal to or greater than a preset value among the plurality of sound waveforms as a sound waveform matching the noise sound, and the preset value may be changed according to a surrounding environment information of the vehicle.

In accordance with another aspect of the disclosure, a control method of a vehicle includes: receiving a noise sound through a microphone; generating a noise canceling signal based on the noise sound; controlling a speaker to output a noise canceling sound corresponding to the noise canceling signal; comparing a waveform of the noise sound with a plurality of previously stored sound waveforms when a sound pressure level of the noise sound is greater than a threshold value; and when the waveform of the noise sound matches any one of the plurality of previously stored sound waveforms, controlling the speaker to play a warning sound source corresponding to the sound waveform matching the noise sound.

The control method may further include: controlling the speaker to stop an output of the noise canceling sound while comparing the waveform of the noise sound with the plurality of previously stored sound waveforms.

The control method may further include: when the sound pressure level of the noise sound is greater than the threshold value and the waveform of the noise sound does not match all of the plurality of previously stored sound waveforms, controlling the speaker to stop the output of the noise canceling sound until the sound pressure level of the noise sound is the threshold value or less.

The control method may further include: setting the threshold value based on at least one of an average sound pressure level of the noise sound received through the microphone during a preset period and a vehicle speed.

The control method may further include: classifying the noise sound as a one-off noise sound or a continuous noise sound based on a period in which the sound pressure level of the noise sound is greater than the threshold value; and determining a distance between a source of the noise sound and the vehicle based on a frequency of the noise sound when the noise sound is classified as the continuous noise sound.

The control method may further include: adjusting a volume of the warning sound source in proportion to a frequency of the noise sound when a period in which the sound pressure level of the noise sound is greater than the threshold value is greater than or equal to a preset period.

The control method may further include: adjusting an output intensity of the noise canceling sound in inverse proportion to the frequency of the noise sound.

The control method may further include: controlling the speaker to reduce an output intensity of the noise canceling sound while the warning sound source is being played through the speaker.

The control method may further include: determining a volume of the warning sound source based on the sound pressure level of the noise sound.

The control method may further include: controlling the display to output a warning message corresponding to a sound waveform matching the noise sound.

The comparing a waveform of the noise sound with a plurality of previously stored sound waveforms may include: determining a sound waveform having a similarity with the waveform of the noise sound equal to or greater than a preset value among the plurality of previously stored sound waveforms as a sound waveform matching the noise sound, and the preset value may be changed according to a surrounding environment information of the vehicle.

In accordance with another aspect of the disclosure, a vehicle includes: a microphone configured to receive a noise sound; a speaker; a storage configured to store a plurality of sound waveforms; and a controller configured to generate a noise canceling signal based on the noise sound and control the speaker to output a noise canceling sound corresponding to the noise canceling signal, and the controller is configured to compare a waveform of the noise sound with the plurality of sound waveforms when a sound pressure level of the noise sound is greater than a threshold value, when the waveform of the noise sound matches any one of the plurality of sound waveforms, generate a warning sound source by correcting the noise sound, and control the speaker to play the warning sound source.

The controller may be configured to correct the noise sound using an A-weighting filter, a B-weighting filter, a C-weighting filter, or a D-weighting filter.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

These and/or other aspects of the disclosure will become apparent and more readily appreciated from the following description of the forms, taken in conjunction with the accompanying drawings of which:

Figure 1:
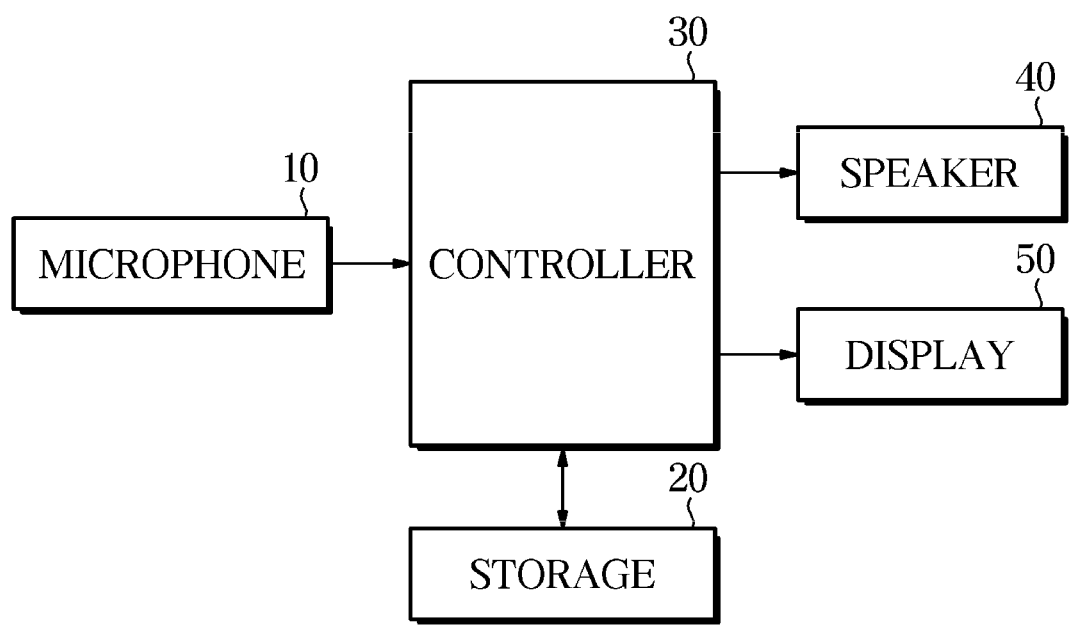
FIG. 1 is a control block diagram of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Like reference numerals refer to like elements throughout the specification. Not all elements of forms of the disclosure will be described, and description of what are commonly known in the art or what overlap each other in the forms will be omitted.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

As used herein, the singular forms "a," "an" and "the" are intended to include the plural forms as well, unless the context clearly indicates otherwise.

As used herein, the terms "portion," "unit," "block," "member," and "module" refer to a unit that can perform at least one function or operation. For example, these terms may refer to at least one process which is performed by at least one piece of hardware such as a field-programmable gate array (FPGA) and an application specific integrated circuit (ASIC), and at least one piece of software stored in a memory or a processor.

An identification code is used for the convenience of the description but is not intended to illustrate the order of each step. Each of the steps may be implemented in an order different from the illustrated order unless the context clearly indicates otherwise.

In the present specification, "occupant" may mean everyone located inside a vehicle, and may include a driver.

Hereinafter, a vehicle and a control method in some forms of the present disclosure are described in detail with reference to the accompanying drawings.

FIG. 1 is a control block diagram of a vehicle in some forms of the present disclosure.

Referring to FIG. 1, a vehicle in some forms of the present disclosure may include a microphone 10 for receiving a noise sound, a storage 20 for storing a plurality of sound waveforms and a warning sound source corresponding to each of the plurality of sound waveforms, a controller 30 that controls various components in the vehicle in order to implement the noise canceling function, at least one speaker 40 that outputs various sounds, and a display 50 that outputs various information.

The microphone 10 may receive the noise sound and output the noise sound as an electrical signal, and transmit it to the controller 30.

The noise sound may include both an external noise sound introduced from the outside of the vehicle and an internal noise sound generated inside the vehicle.

The microphone 10 may be provided in various positions of the vehicle to receive noise sound, and may be plural. That is, the installation location of the microphone 10 is not limited as long as it can receive noise sound, and the number of installations of the microphone 10 is also not limited.

The storage 20 may store a plurality of sound waveforms and a warning sound source corresponding to each of the plurality of sound waveforms. In addition, the storage 20 may store warning messages corresponding to a plurality of sound waveforms.

The plurality of sound waveforms may be sound waveforms obtained by receiving original sounds of various noise sounds.

For example, the plurality of sound waveforms may include waveforms for various sounds such as a sound waveform of the construction site collected at the construction site, a sound waveform of the emergency vehicle collected from the siren sound of the emergency vehicle, a crash sound waveform generated in a crash accident, a horn sound waveform of the vehicle, a waveform of a human scream sound, a waveform of a broadcast sound of a police car, and a waveform of a sound of a national disaster siren.

As such, the plurality of sound waveforms may refer to waveforms for sounds that must be listened to by the vehicle occupant in order to recognize a situation outside the vehicle.

The warning sound source corresponding to each of the plurality of sound waveforms may be a sound source generated by correcting or processing the plurality of sound waveforms.

For example, the warning sound source corresponding to the sound waveform at the construction site may be a sound source obtained by processing the sound waveform at the construction site, or may be a sound source obtained by increasing the loudness of the sound waveform at the construction site. This is described later with reference to FIG. 5.

In addition, the warning message corresponding to each of the plurality of sound waveforms may include information on sources of noise sound that obtains the plurality of sound waveforms.

For example, a warning message corresponding to a sound waveform at a construction site may include a figure that reminds the construction site and/or the phrase "under construction.

A storage 20 for storing information/data, such as a sound source corresponding to each of the plurality of sound waveforms and/or the plurality of sound waveforms, and/or a warning message corresponding to each of the plurality of sound waveforms may be implemented as at least one of a non-volatile memory devices such as a cache, read only memory (ROM), programmable ROM (PROM), erasable programmable ROM (EPROM), electrically erasable programmable ROM (EEPROM), and flash memory or a volatile memory device such as random access memory (RAM), or a storage medium such as a hard disk drive (HDD) or a CD-ROM in order to store various types of information. However, the present disclosure is not limited thereto. The storage 20 may be a memory implemented as a separate chip, or may be implemented as a single chip with at least one processor included in the controller 30.

The controller 30 may generate a noise canceling signal based on the noise sound received through the microphone 10 and control the speaker 40 to output a noise canceling sound corresponding to the noise canceling signal.

Specifically, the controller 30 analyzes the waveform of the noise sound received through the microphone 10, generates a waveform signal having an opposite phase, and controls the speaker 40 to output a waveform of the opposite phase to cause destructive interference to the noise sound, thereby reducing a noise sound that can be heard by the occupant.

In addition, as will be described later, the controller 30 can control the speaker 40 to select an important sound to be recognized by the occupant and play a warning sound source, and control the display 50 to output a warning message.

The controller 30 may include at least one memory storing a program for performing the above-described operation and an operation described later, and at least one processor executing the stored program. When there are a plurality of memories and processors, they may be integrated on one chip, or may be provided in physically separate locations.

For example, the controller 30 may include at least one processor mounted in the vehicle head unit, Audio, Video, Navigation and Telematics (AVNT) terminal unit, but is not limited thereto, and may also include a separate processor provided inside the vehicle.

The speaker 40 may output various sounds based on a control signal received from the controller 30. For example, the speaker 40 may output a noise canceling sound based on the noise canceling signal received from the controller 30 and may output a warning sound source based on the warning sound source output signal.

That is, the speaker 40 may transmit various sounds to the occupant by converting an electrical signal into sound.

The speaker 40 may be provided at various positions of the vehicle to output a noise canceling sound and/or a warning sound source, and may be a plurality of speakers. That is, the installation position of the speaker 40 is not limited as long as it is a position capable of transmitting various sounds to the occupant, and the number of installations of the speaker 40 is also not limited.

When there are a plurality of speakers 40, the controller 30 may add directionality to the warning sound transmitted to the occupant by controlling the volume of the warning sound source transmitted to each speaker 40 differently.

For example, when adjusting the volume of the warning sound source output from the speaker 40 provided on the right side of the occupant to increase and when adjusting the volume of the warning sound source output from the speaker 40 provided on the left side of the occupant, the occupant can feel that the warning sound is coming from the right.

The display 50 may visually output various types of information based on a control signal received from the controller 30. For example, the display 50 may output a warning message based on the warning message output signal received from the controller 30.

The display 50 for this may include various display devices provided inside the vehicle. For example, the display 50 may include a cluster of a vehicle, a head-up display (HUD) device, a display of an AVNT device, and the like.

That is, the display 50 may include all components capable of visually providing various types of information to an occupant.

In some forms of the present disclosure, the microphone 10, the storage 20, the controller 30, the speaker 40, and the display 50 may communicate with each other by performing Controller Area Network (CAN) communication to transmit respective information, and may perform wired communication to transmit respective information. For example, for control of various electric loads mounted on a vehicle and communication between various electric loads, in the vehicle, a communication network including a body network, a multimedia network, and a chassis network is configured, and each of the networks separated from each other may be connected by the controller 30 in order to exchange CAN communication messages with each other.

In the above, the configuration of a vehicle in some forms of the present disclosure and the operation and structure of each component have been described. Hereinafter, a control method of a vehicle using various configurations of the vehicle is described in detail.

Figure 2:
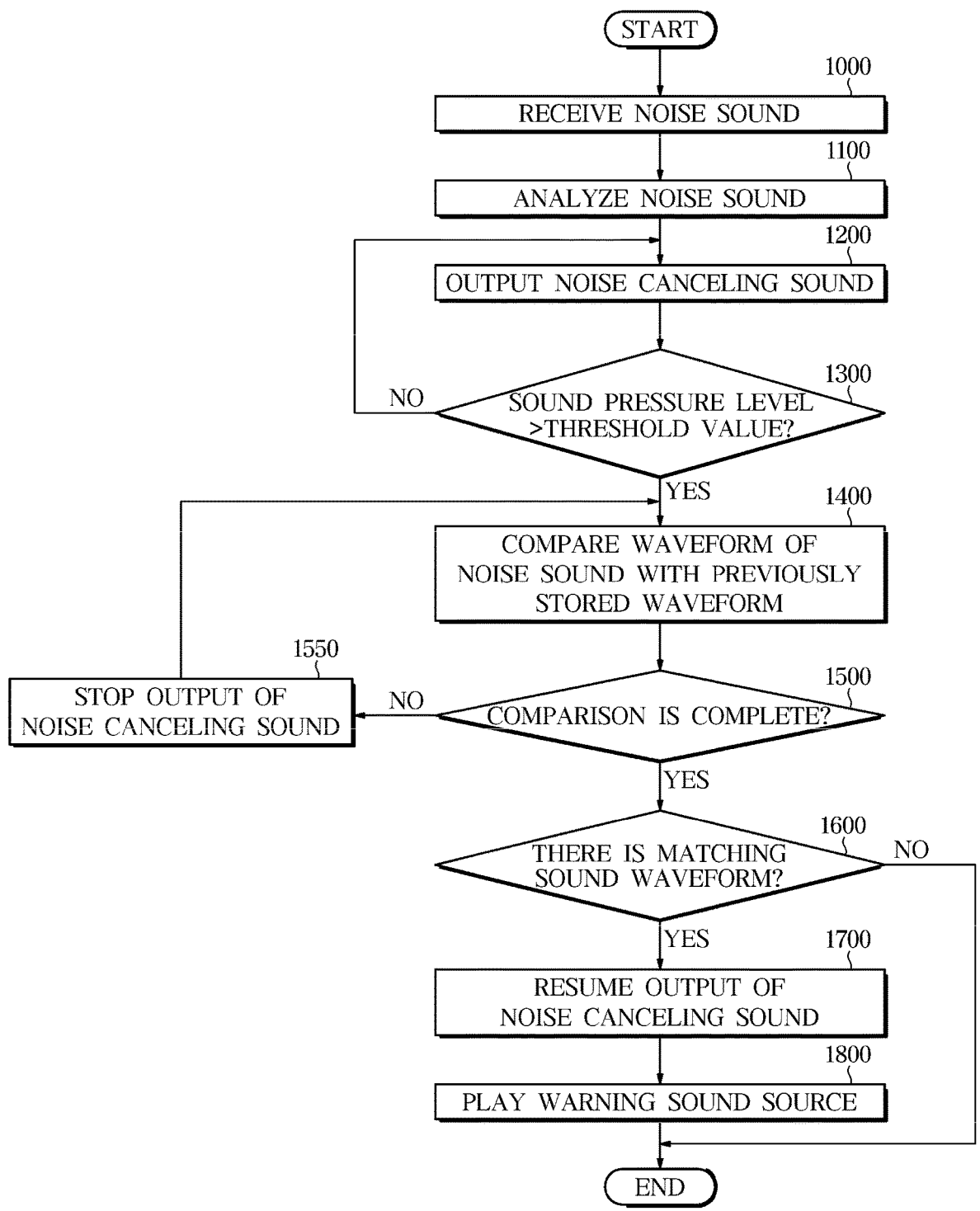
FIG. 2 is a flowchart of a control method of a vehicle in one form of the present disclosure.
Figure 3:
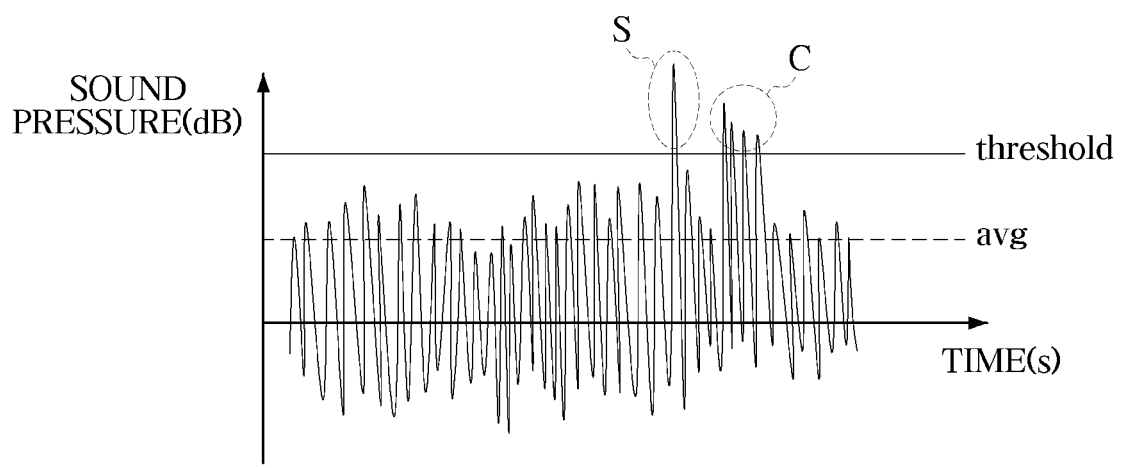
FIG. 3 is a diagram for illustrating a criterion for a vehicle to select an important sound in one form of the present disclosure.
Figure 4:
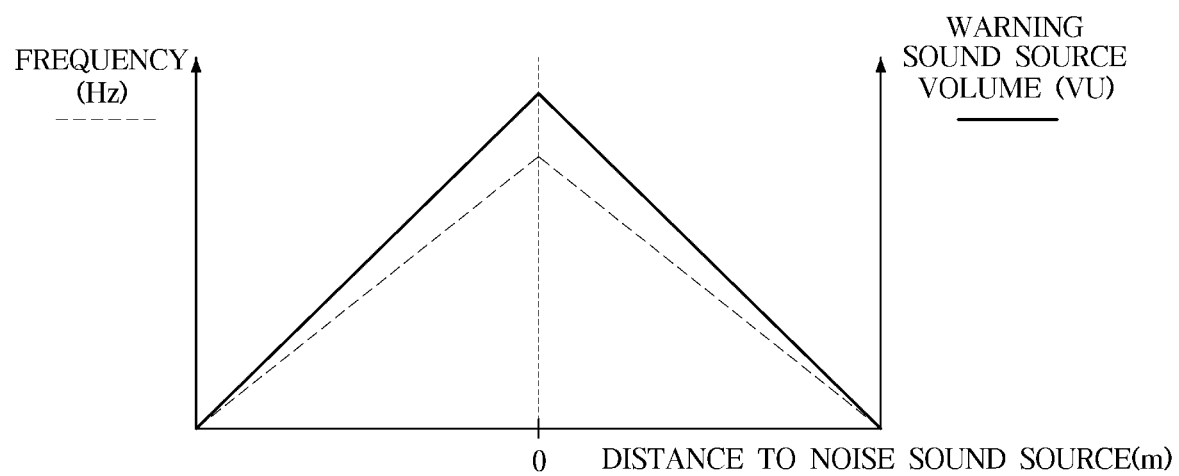
FIG. 4 is a diagram for illustrating a criterion for a vehicle to adjust a volume of a warning sound source in one form of the present disclosure.
Figure 5:
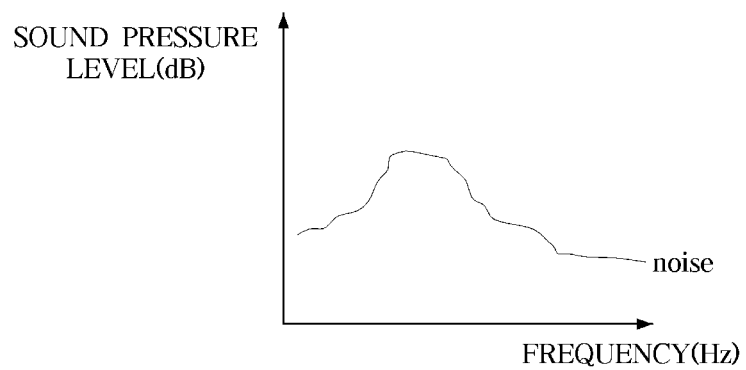
FIG. 5 is a diagram for illustrating a warning sound source output from a vehicle in one form of the present disclosure.
Figure 5:
Figure 5:
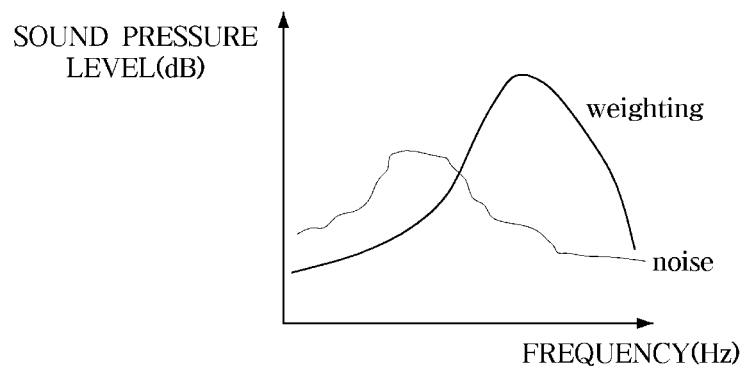
Figure 5:
Figure 5:
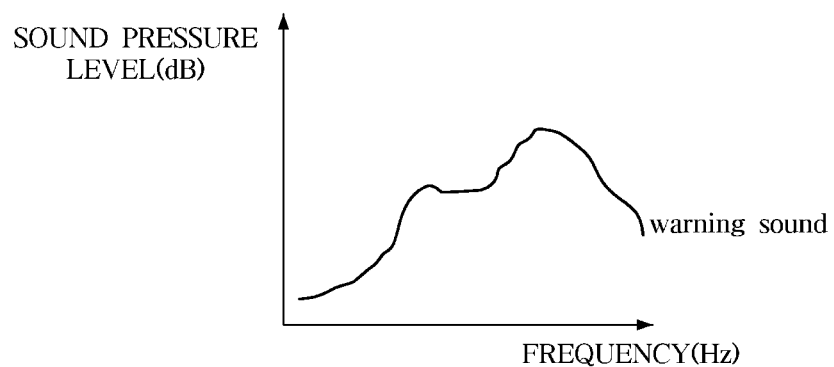
Figure 6:
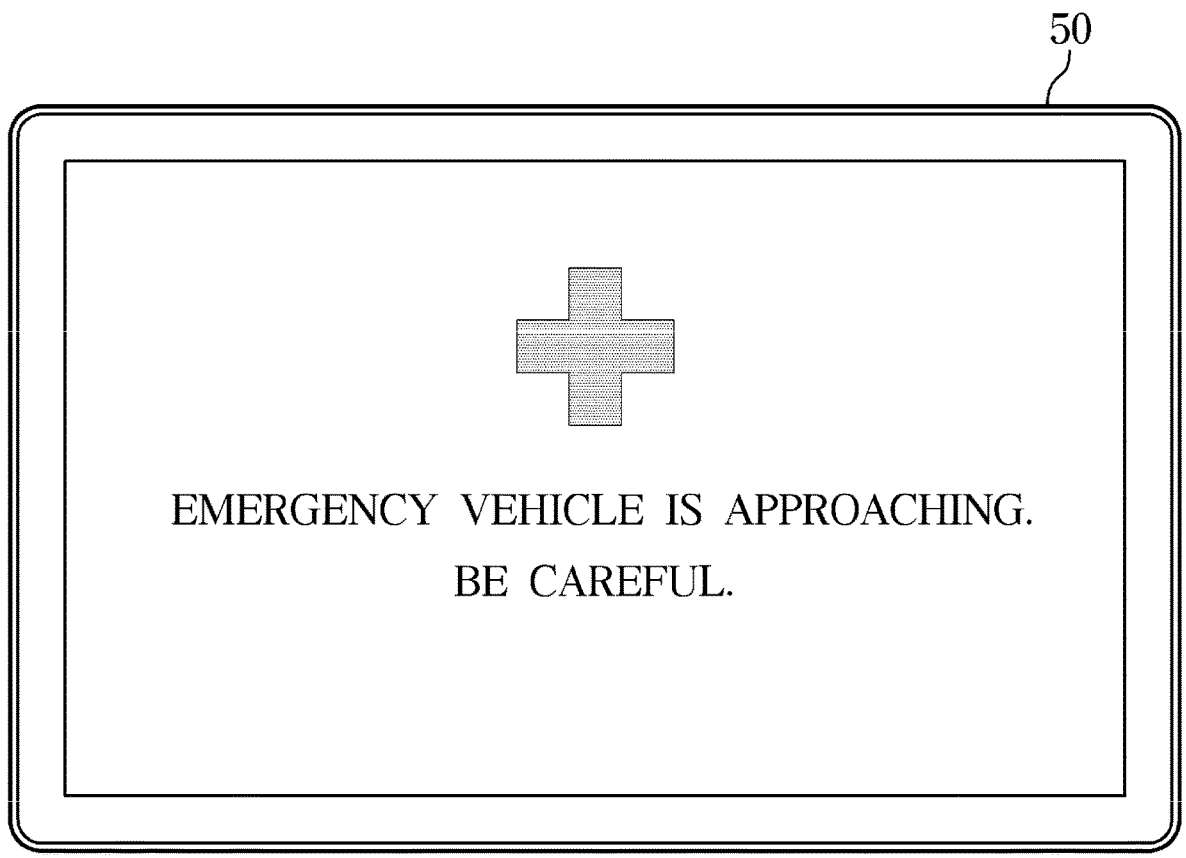
FIG. 6 is a diagram illustrating a warning message output from a vehicle in one form of the present disclosure.

FIG. 2 is a flowchart of a control method of a vehicle in some forms of the present disclosure. FIG. 3 is a diagram for illustrating a criterion for a vehicle to select an important sound in some forms of the present disclosure. FIG. 4 is a diagram for illustrating a criterion for a vehicle to adjust a volume of a warning sound source in some forms of the present disclosure. FIG. 5 is a diagram for illustrating a warning sound source output from a vehicle in some forms of the present disclosure. FIG. 6 is a diagram illustrating a warning message output from a vehicle in some forms of the present disclosure.

Referring to FIG. 2, the microphone 10 may receive a noise sound and output it as an electrical signal, and the controller 30 may receive a noise sound output as an electrical signal from the microphone 10 (1000).

The controller 30 can analyze the waveform, sound pressure level, and frequency of the noise sound (1100), generate a noise canceling signal based on the noise sound, and control the speaker 40 to output a noise canceling sound corresponding to the noise canceling signal (1200). In this case, the noise canceling signal may have a waveform having a phase opposite to that of the waveform of the noise sound.

When the sound pressure level of the noise sound is the threshold value or less (NO in 1300), the controller 30 may block the noise sound directed to the occupant by controlling the speaker 40 to continuously output the noise canceling sound.

When the sound pressure level of the noise sound is greater than the threshold value (YES in 1300), the controller 30 may compare the waveform of the noise sound with a plurality of sound waveforms stored in the storage 20 (1400).

The controller 30 may determine that the comparison is complete when the waveform of the noise sound matches any one of a plurality of sound waveforms stored in the storage 20, or may determine that the comparison is complete when the waveform of the noise sound does not match all of the plurality of waveforms stored in the storage 20 (1500).

The controller 30 may control the speaker 40 to stop the output of the noise canceling sound while comparing the waveform of the noise sound with a plurality of sound waveforms stored in the storage 20 (No in 1500) (1550).

Accordingly, a noise sound (hereinafter referred to as "special noise sound") having a sound pressure level greater than the threshold value may be transmitted to the occupant. In the case of a special noise sound, it may be an important sound that the occupant must recognize, and may include, for example, a collision sound between another vehicles, a noise at a construction site, a siren sound of an emergency vehicle, and the like.

The controller 30 can stop the output of the noise canceling sound until it correctly grasps what kind of noise sound the special noise sound is, so that the occupant can immediately recognize a dangerous situation.

In this case, the threshold value compared with the sound pressure level of the noise sound may be a specific value stored in the storage 20 or may be a specific value determined by the controller 30 according to the surrounding environment of the vehicle.

For example, the controller 30 may set the threshold value based on an average sound pressure level of noise sound received through the microphone 10 for a preset period and/or vehicle speed.

Referring to FIG. 3, the controller 30 may determine an average sound pressure level (avg) of the noise sound received through the microphone 10 for a preset period. Specifically, the controller 30 may determine the average sound pressure level (avg) of the noise sound received through the microphone 10 for a preset period according to a predetermined period, and may set a threshold value based on the average sound pressure level (avg).

The controller 30 may set a threshold value by adding a preset sound pressure level to an average sound pressure level (avg) or multiplying a preset weight.

For example, when the average sound pressure level is 40 dB, the controller 30 may set a 60 dB, which is 40 dB plus 20 dB, which is a preset sound pressure level, as a threshold value, or may set a 60 dB, which is 40 dB multiplied by a preset weight of 1.5, as a threshold value.

In addition, the controller 30 may set a threshold value in proportion to the vehicle speed. This is because, as the vehicle speed increases, the friction sound due to air friction and/or road friction increases, so it is necessary to set a larger threshold value.

The controller 30 may distinguish the type of noise sound as a one-off special noise sound S when the period in which the sound pressure level of the noise sound is greater than the threshold value is shorter than the preset period. Conversely, the controller 30 may distinguish the type of the noise sound as a continuous special noise sound C when a period in which the sound pressure level of the noise sound is greater than the threshold value is equal to or greater than a preset period.

In this case, the preset period may be set to about 1 second, but is not limited thereto, and if it is a reference value for distinguishing one-off special noise sound S and continuous special noise sound C, it may be set without limitation.

The plurality of sound waveforms stored in the storage 20 may be classified into a one-off special noise sound S waveform and a continuous special noise sound C waveform and stored.

When the noise sound is determined as the one-off special noise sound S, the controller 30 may compare the waveform of the noise sound with waveforms of the one-off special noise sound S. When the noise sound is determined as the continuous special noise sound C, the controller 30 may compare the waveform of the noise sound with the waveforms of the continuous special noise sound C.

For example, the one-off special noise sound S may include a collision sound, a horn sound, a pedestrian's yelling, etc., and the continuous special noise sound C may include a siren sound generated from an emergency vehicle, a noise generated at a construction site, a broadcast sound generated from a police car, and the like.

When it is not known what kind of noise sound the special noise sound is, that is, when the waveform of the noise sound does not match all of the plurality of sound waveforms stored in the storage 20 (No in 1600), the controller 30 may control the speaker 40 to stop the output of the noise canceling sound until the sound pressure level of the noise sound received through the microphone 10 is less than or equal to the threshold value.

That is, according to the control method of the vehicle in some forms of the present disclosure, in the case of a special noise sound whose type cannot be determined, there may be a need for the occupant to recognize it, so the output of the noise canceling sound can be continuously stopped so that the occupant can recognize a special noise sound.

When the waveform of the noise sound matches any one of the plurality of sound waveforms stored in the storage 20 (Yes in 1600), the controller 30 may control the speaker 40 to resume output of the noise canceling sound (1700), and control the speaker 40 to play a warning sound source corresponding to a sound waveform matching the noise sound (1800).

The volume of the warning sound source played through the speaker 40 may be determined according to the sound pressure level of the noise sound. For example, the controller 30 may determine the volume of the warning sound source based on the sound pressure level of the noise sound. Specifically, the controller 30 may adjust the volume of the warning sound source to increase in proportion to the sound pressure level of the noise sound.

Additionally, when the waveform of the noise sound matches any one of the plurality of sound waveforms stored in the storage 20 (Yes in 1600), the controller 30 may control the speaker 40 to reduce the output intensity of the noise canceling sound.

The controller 30 may control the speaker 40 so that the output intensity of the noise canceling sound is reduced while the warning sound source is played through the speaker 40. Meaning that the output intensity of the noise canceling sound is reduced may mean that the noise canceling intensity is weakened.

That is, in some forms of the present disclosure, when it is determined that the noise sound is an important sound that the occupant needs to recognize, by outputting a warning sound source and weakening the intensity of noise canceling, it can help the occupant to more effectively grasp the situation around the vehicle.

Matching the waveform of the noise sound with the sound waveform stored in the storage 20 may mean that similarity between the waveform of the noise sound and the sound waveform stored in the storage 20 is greater than or equal to a preset value.

To this end, the controller 30 extracts sound quality factors such as a frequency band, sound pressure level, and loudness of the noise sound based on the waveform of the noise sound, and may compare these sound quality factors with sound quality factors of a sound waveform stored in the storage 20.

In addition, the controller 30 may recognize the type of noise sound by using the waveform of the noise sound as input data of a neural network that has been learned in advance. In this case, the neural network learned in advance may be learned by using a plurality of noise sound sources as input data, and may be learned to output type information of the noise sound source as output data.

When the controller 30 recognizes the type of noise sound, the controller 30 may control the speaker 40 to play a warning sound source corresponding to the type of noise sound.

In addition, the controller 30 may receive information on the surrounding environment of the vehicle through sensors such as a camera and a radar installed in the vehicle, and may identify the type of noise sound by referring to the information on the surrounding environment of the vehicle.

For example, when a construction site sign is recognized through a camera, the controller 30 may determine the type of the noise sound as the construction site sound even if the similarity between the waveform of the noise sound and the construction site sound waveform stored in the storage 20 is less than or equal to a preset value.

That is, the preset value, which is a reference for comparing the waveform of the noise sound received through the microphone 10 and the plurality of sound waveforms stored in the storage 20, may be changed according to information on the surrounding environment of the vehicle.

In addition, the controller 30 may receive information on the environment around the vehicle through the navigation device, and may identify the type of noise sound by referring to the information on the environment around the vehicle.

When the noise sound is a continuous special noise sound C, the source of the noise sound may be fixed at a specific position, or the source of the noise sound may be moving.

As the vehicle in some forms of the present disclosure approaches the source of the noise sound, that is, as the distance between the vehicle and the source of the noise sound gets closer, the frequency of the noise sound increases according to the Doppler effect.

Conversely, the farther the vehicle is from the source of the noise sound, that is, as the distance between the vehicle and the source of noise sound increases, the frequency of the noise sound is lowered according to the Doppler effect.

When the source of the noise sound moves away from the vehicle, the occupant does not need to worry about the source of the noise sound.

Accordingly, referring to FIG. 4, when the noise sound received through the microphone 10 is determined as a continuous special noise sound C, the controller 30 may adjust the volume of the warning sound source in proportion to the frequency of the noise sound.

The controller 30 may adjust the volume of the warning sound source in proportion to the frequency of the noise sound when a period in which the sound pressure level of the noise sound is greater than the threshold value is equal to or greater than a preset period.

Specifically, the controller 30 may increase the volume of the warning sound source as the frequency of the noise sound increases, and may decrease the volume of the warning sound source as the frequency of the noise sound decreases.

Additionally, the controller 30 may adjust the output intensity of the noise canceling sound in inverse proportion to the frequency of the noise sound. That is, the controller 30 may adjust the intensity of noise canceling to decrease as the frequency of the noise sound increases, and may adjust the intensity of noise canceling to increase as the frequency of the noise sound decreases.

In this way, when the noise sound received through the microphone 10 is determined as a continuous special noise sound C, the reason for determining the distance to the noise sound source based on the frequency of the noise sound is that if the distance to the noise sound source is simply determined as the sound pressure level of the noise sound, there may be an error due to the volume change of the noise sound generated by the noise sound source itself.

In the above, a process of playing a warning sound source by a vehicle in some forms of the present disclosure has been described. Hereinafter, the warning sound source will be described in detail.

According to the control method of the vehicle in some forms of the present disclosure, a warning sound source corresponding to a sound waveform matching a noise sound may be stored in the storage 20.

This warning sound source may be generated by correcting each of a plurality of waveforms stored in the storage 20.

The equal loudness contour is a curve that is the basis of the frequency weighting to obtain the magnitude of the noise sound. In order to consider the sensitivity of humans according to the frequency, if the filter is made by inverting the equal loudness contour, the perception of the warning sound of the occupant may be improved.

An A-weighting filter, a B-weighting filter, a C-weighting filter, or a D-weighting filter may be used as a filter for improving the warning sound recognition of the occupant.

That is, the warning sound source corresponding to each of the plurality of waveforms may be a result of processing each of the plurality of waveforms through the A-weighting filter, the B-weighting filter, the C-weighting filter, or the D-weighting filter.

Referring to FIG. 5, a process of generating a specific warning sound source can be confirmed by processing each signal of a specific original noise sound through the A-weighting filter, the B-weighting filter, the C-weighting filter, or the D-weighting filter.

As an example, the first warning sound source corresponding to the first sound waveform for the siren sound of the emergency vehicle may be a sound source obtained by processing the first sound waveform through the A-weighting filter, the B-weighting filter, the C-weighting filter, or the D-weighting filter.

In general, the A-weighting filter is used when processing a noise sound, but the warning sound source according to the present disclosure may be generated using the D-weighting filter. Accordingly, a warning sound source can be played and delivered to a user more effectively.

For example, the first warning sound source corresponding to the first sound waveform for the siren sound of the emergency vehicle may be a sound source generated by processing the first sound waveform using the D-weighting filter.

According to the control method of the vehicle in some forms of the present disclosure, when the sound pressure level of the noise sound is greater than the threshold value, the controller 30 compares the waveform of the noise sound with a plurality of sound waveforms stored in the storage 20. When the waveform of the noise sound matches any one of the plurality of sound waveforms, the controller 30 generates a warning sound source by correcting the noise sound, and controls the speaker 40 to play the warning sound source.

In this case, the controller 30 may correct the noise sound using an A-weighting filter, a B-weighting filter, a C-weighting filter, or a D-weighting filter.

That is, in some forms of the present disclosure, instead of using the warning sound source stored in the storage 20, a special noise sound can be immediately processed to generate a warning sound source. Accordingly, a warning sound that is most similar to the noise sound generated around the current vehicle and has improved recognition can be provided to the user.

Referring to FIG. 6, the controller 30 in some forms of the present disclosure may control the display 50 to output a warning message corresponding to a sound waveform matching a noise sound.

When the sound waveform matching the noise sound is a siren waveform of an emergency vehicle, the warning message corresponding to the siren waveform of the emergency vehicle may include a figure representing a hospital and/or a phrase indicating that the emergency vehicle is approaching.

In some forms of the present disclosure, the external situation of the vehicle can be transmitted to an occupant who cannot hear sound, such as a deaf person.

According to the vehicle and the control method thereof according to an aspect, a comfortable space is provided by blocking noise sound transmitted to an occupant, and at the same time, an important sound that the occupant must recognize can be selectively output to pursue stability.

In addition, it is possible to convey the external situation of the vehicle to occupants who cannot hear sound, such as a deaf person.

Meanwhile, some forms of the present disclosure may be implemented in the form of a recording medium storing instructions that are executable by a computer. The instructions may be stored in the form of a program code, and when executed by a processor, the instructions may generate a program module to perform operations of some forms of the present disclosure. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The forms of the disclosure have thus far been described with reference to the accompanying drawings. It will be obvious to those of ordinary skill in the art that the disclosure may be practiced in other forms than the exemplary forms as described above without changing the technical idea or essential features of the disclosure. The above exemplary forms are only by way of example, and should not be interpreted in a limited sense.

What is claimed is:

1. A vehicle comprising:
   a microphone configured to receive a noise sound;
   a speaker;
   a storage configured to store a plurality of sound waveforms and a warning sound source corresponding to each sound waveform of the plurality of sound waveforms; and
   a controller configured to:
   generate a noise canceling signal based on the noise sound;
   control the speaker to output a noise canceling sound corresponding to the noise canceling signal;
   compare a waveform of the noise sound with the plurality of sound waveforms when a sound pressure level of the noise sound is greater than a threshold value;

when the waveform of the noise sound matches any sound waveform of the plurality of sound waveforms, control the speaker to play a warning sound source corresponding to the sound waveform matching the noise sound; and control the speaker to stop an output of the noise canceling sound while comparing the waveform of the noise sound with the plurality of sound waveforms.

2. The vehicle of claim 1, wherein the controller is configured to, when the sound pressure level of the noise sound is greater than the threshold value and the waveform of the noise sound does not match all of the plurality of sound waveforms, control the speaker to stop the output of the noise canceling sound until the sound pressure level of the noise sound is equivalent to or less than the threshold value.

3. The vehicle of claim 1, wherein the controller is configured to set the threshold value based on at least one of an average sound pressure level of the noise sound received through the microphone during a preset period or a vehicle speed.

4. The vehicle of claim 1, wherein the controller is configured to:
classify the noise sound as a one-off noise sound or a continuous noise sound based on a period in which the sound pressure level of the noise sound is greater than the threshold value; and
determine a distance between a source of the noise sound and the vehicle based on a frequency of the noise sound when the noise sound is classified as the continuous noise sound.

5. The vehicle of claim 1, wherein the controller is configured to adjust a volume of the warning sound source in proportion to a frequency of the noise sound when a period in which the sound pressure level of the noise sound is greater than the threshold value is greater than or equal to a preset period.

6. The vehicle of claim 5, wherein the controller is configured to adjust an output intensity of the noise canceling sound in inverse proportion to the frequency of the noise sound.

7. The vehicle of claim 1, wherein the controller is configured to control the speaker to reduce an output intensity of the noise canceling sound when the warning sound source is played through the speaker.

8. The vehicle of claim 1, wherein the controller is configured to determine a volume of the warning sound source based on the sound pressure level of the noise sound.

9. The vehicle of claim 1, further comprising:
a display, and
wherein the storage is configured to store a warning message corresponding to each sound waveform of the plurality of sound waveforms, and
wherein the controller is configured to control the display to output a warning message corresponding to a sound waveform matching the noise sound.

10. The vehicle of claim 1, wherein the controller is configured to:
determine that a sound waveform of the plurality of sound waveforms having a similarity with the waveform of the noise sound equal to or greater than a preset value is a sound waveform matching the noise sound; and
change the preset value according to a surrounding environment information of the vehicle.

11. A control method of a vehicle, the control method comprising:

receiving a noise sound through a microphone;
generating a noise canceling signal based on the noise sound;
controlling a speaker to output a noise canceling sound corresponding to the noise canceling signal;
comparing a waveform of the noise sound with a plurality of previously stored sound waveforms when a sound pressure level of the noise sound is greater than a threshold value; and
when the waveform of the noise sound matches any one of the plurality of previously stored sound waveforms, controlling the speaker to play a warning sound source corresponding to the sound waveform matching the noise sound; and
controlling the speaker to stop an output of the noise canceling sound while comparing the waveform of the noise sound with the plurality of previously stored sound waveforms.

12. The control method of claim 11, further comprising, when the sound pressure level of the noise sound is greater than the threshold value and the waveform of the noise sound does not match all of the plurality of previously stored sound waveforms, controlling the speaker to stop the output of the noise canceling sound until the sound pressure level of the noise sound is equivalent to or less than the threshold value.

13. The control method of claim 11, further comprising setting the threshold value based on at least one of an average sound pressure level of the noise sound received through the microphone during a preset period or a vehicle speed.

14. The control method of claim 11, further comprising:
classifying the noise sound as a one-off noise sound or a continuous noise sound based on a period in which the sound pressure level of the noise sound is greater than the threshold value; and
determining a distance between a source of the noise sound and the vehicle based on a frequency of the noise sound when the noise sound is classified as the continuous noise sound.

15. The control method of claim 11, further comprising adjusting a volume of the warning sound source in proportion to a frequency of the noise sound when a period in which the sound pressure level of the noise sound is greater than the threshold value is greater than or equal to a preset period.

16. The control method of claim 15, further comprising adjusting an output intensity of the noise canceling sound in inverse proportion to the frequency of the noise sound.

17. A vehicle comprising:
a microphone configured to receive a noise sound;
a speaker;
a storage configured to store a plurality of sound waveforms; and
a controller configured to:
generate a noise canceling signal based on the noise sound;
control the speaker to output a noise canceling sound corresponding to the noise canceling signal;
compare a waveform of the noise sound with the plurality of sound waveforms when a sound pressure level of the noise sound is greater than a threshold value;
when the waveform of the noise sound matches any sound waveform of the plurality of sound waveforms, generate a warning sound source by correcting the noise sound, and control the speaker to play the warning sound source; and control the speaker to stop an output of the noise canceling sound while comparing the waveform of the noise sound with the plurality of sound waveforms.

18. The vehicle of claim 17, wherein the controller is configured to correct the noise sound using an A-weighting filter, a B-weighting filter, a C-weighting filter, or a D-weighting filter.

19. The vehicle of claim 17, wherein the controller is configured to:

classify the noise sound as a one-off noise sound or a continuous noise sound based on a period in which the sound pressure level of the noise sound is greater than the threshold value; and determine a distance between a source of the noise sound and the vehicle based on a frequency of the noise sound when the noise sound is classified as the continuous noise sound.

20. The vehicle of claim 17, wherein the controller is configured to adjust a volume of the warning sound source in proportion to a frequency of the noise sound when a period in which the sound pressure level of the noise sound is greater than the threshold value is greater than or equal to a preset period.

* * * * *

UNITED STATES PATENT AND TRADEMARK OFFICE
CERTIFICATE OF CORRECTION

| | |
|---|---|
| PATENT NO. | : 11,626,096 B2 |
| APPLICATION NO. | : 17/459744 |
| DATED | : April 11, 2023 |
| INVENTOR(S) | : Chongbae Park |

It is certified that error appears in the above-identified patent and that said Letters Patent is hereby corrected as shown below:

On the Title Page

Item (73) Assignees; delete "Comoration" and insert --Corporation--.

In the Claims

Claim 11, Column 14, Line 9; delete "and".

Signed and Sealed this
Sixteenth Day of May, 2023

*Katherine Kelly Vidal*

Katherine Kelly Vidal
*Director of the United States Patent and Trademark Office*